United States Patent [19]

Erhardt et al.

[11] 3,847,644

[45] Nov. 12, 1974

[54] IMAGING BY PHASE AGGREGATION FROM BLOCK COPOLYMERS

[75] Inventors: Peter Franklin Erhardt, Webster; Irwin Andrew Wiehe, Fairport, both of N.Y.

[73] Assignee: Xerox Corporation, Stamford, Conn.

[22] Filed: Nov. 24, 1972

[21] Appl. No.: 309,384

[52] U.S. Cl................ 117/36.7, 117/1.7, 117/76 T, 117/138.8 A, 117/138.8 F, 117/145
[51] Int. Cl............................................. B41m 5/00
[58] Field of Search......... 117/36.7, 76 T, 36.1, 1.7; 260/876 B, 880 B

[56] References Cited
UNITED STATES PATENTS

| | | | |
|---|---|---|---|
| 3,694,246 | 9/1972 | Purcell et al. | 117/36.7 |
| 3,708,323 | 1/1973 | Stroble | 117/36.7 |
| 3,100,702 | 8/1963 | Rauner et al. | 96/33 |
| 2,718,476 | 9/1955 | Eichorn | 117/76 T |

*Primary Examiner*—Thomas J. Herbert, Jr.

[57] ABSTRACT

A recording material comprised of a substrate having a uniform coating of a film forming block copolymer which upon imagewise exposure to energy radiation causes phase separation in the exposed areas thereby producing a visible image.

8 Claims, No Drawings

IMAGING BY PHASE AGGREGATION FROM BLOCK COPOLYMERS

BACKGROUND OF THE INVENTION

The present invention relates to an imaging system, and more particularly, to an imaging system employing the phase separation of block copolymers.

It is well-known in the art that certain light sensitive, gas-releasing materials dispersed in matrices of binder materials such as, synthetic high polymers having low permeability coated on a suitable substrate may be utilized for the preparation of images frequently referred to as vesicular images. Vesicular images are formed in a photographic film by small bubbles or vesicles of gas which are formed and trapped in the areas of the film exposed to light and which scatter light.

Other imaging systems also have utilized the principle of forming small bubbles in a matrix in order to produce differential refraction within for the production of a visible image. Such systems employ a film which is prepared by applying thereto an emulsion of the water-in-oil type wherein a film forming plastic is the continuous phase and the dispersed phase is present in the form of multitudinous droplets, almost all of which are of microscopic or submicroscopic dimension, and by drying the film in such a manner that the dispersed phase is evaporated without essential disruption or substantial collapse of the cellular structure of the continuous phase. Briefly, it may be said then that the film consists of a heat-sensitive plastic or plastic composition which has a three-dimensional cellular structure including a multiplicity of enclosed microscopic or submicroscopic voids distributed throughout its volume beneath the outer surface thereof. The plastic, apart from these voids, is substantially continuous and homogenous and the film as a whole is opaque because of its heterogenous physical structure, due to such voids. Under the localized action of a heated stylus, the plastic material is fused, that is, it softens and coalesces with attendant collapse of such voids and release of air therefrom which result in the production of a homogenous relatively transparent area disclosing the underlying dark surface producing a visible image.

However, the above systems suffer from the difficulties that the images obtained often fade rapidly. Moreover, imaging conditions employing high temperatures and other conditions often can lead to decomposition of the sensitizers. In order to produce a sensitive film containing micro and submicroscopic voids, the elaborate process of forming a water-in-oil emulsion has to be performed and coated properly onto a suitable substrate. Furthermore, the above systems do not function effectively for repetitive or cyclic use.

SUMMARY OF THE INVENTION

It is, therefore, an object of this invention to provide an imaging system devoid of the above noted deficiencies.

One objective of this invention is to provide an improved imaging system which does not require the use of sensitizers for image development.

Another object of this invention is to provide a heat-sensitive, dry, non-tacky, or sticky recording material which has numerous microscopic domains therein.

Another object of this invention is to provide a recording material which has inherently improved mechanical strength.

Still another object of this invention is to provide an imaging system wherein the image does not fade.

Still an even further object of this invention is to provide an imaging system in which imaging is achieved by the application of heat.

Still an even further object of this invention is to provide an imaging system capable of repetitive use or cyclic use.

The above objects and others are accomplished, generally speaking by preferentially exposing in an imagewise fashion an area of a suitable substrate composed of a block copolymer with energy radiation so as to produce a phase separation in the substrate forming an image due to contrasting characteristics between the background and image areas which has been shown to arise from the scattering of light. This light scattering arises from phase separation taking place within the copolymer melt to give rise to structures referred to as domains which are generally submicron in size but may be of the order of microns in size and are typically spherical in shape. Because of the size of the scattering entities and the refractive index differences between the aggregate phases, the image formation, therefore, is basically a light scattering phenomena. The scattering of visible light from domain structures is a consequence of the unusually large domains resulting from the long block copolymer lengths employed. The use of such block copolymer systems has been found to be the basis for image formation.

The concept of our invention is further understood when two incompatible homopolymers are mixed. Instead of forming a homogenous mixture, the polymers will form separate and distinctly different phases. However, when these incompatible homopolymers are chemically linked as in the case of block copolymers, complete phase separation is no longer possible but instead the incompatible blocks tend to separate into domains of submicroscopic sizes. According to theory, these domains can have various shapes such as spherical, rod like, etc. Generally, the character of the domain structures depend upon composition, sizes of the blocks, and the manner of preparation, for example, melt forming or casting from solvents. Whatever the method of preparation, the stable domain sizes are attained when there is a balance between the tendency for the positive interfacial free energy to increase the domain dimensions and a tendency of the polymer chain to be reduced to its unperturbed random flight dimensions.

More specifically, according to the process of this invention, a suitable substrate such as paper, is prepared by applying a solution of a film forming block copolymer, e.g. polyethylene oxide-polystyrene copolymer, in a volatile solvent to form a very thin film coating thereon. The film forming block copolymer which forms the coating layer is dissolved in any suitable volatile solvent. Alternatively, a homopolymer, i.e., one component of the block copolymer, may be combined to form a mixture with the block copolymers. Typical examples of solvents are: chloroform, acetone, methylacetate, tetrahydrofuran, dimethylacetal, or methylenechloride. After application to the paper substrate, the solvent is mainly evaporated, so that the substance which forms the coating layer is deposited as a thin uniform film. At this time, domains of the dispersed phase are present but are too small (typically a few hundred angstroms in size) to scatter visible light. Thus the system is heterogenous, but the heterogenous character is not usually apparent. On continued evaporation of the organic liquid, the substance which forms the coating layer combines intimately with the surface of the carrying paper and extremely good adherence is obtained. The color of the carrying paper is preferably light, but under certain circumstances an opaque or black paper may be provided so that the color is sufficiently dark to have improved image contrast to the background. As to the method used in the application of a thin film to the substrate, other techniques which are well-known in the art may be employed such as roller coating, spraying, printing, floating or by a knife coating process. While coating a substrate represents one method of forming the recording material of this invention, the film forming polymer may also be self-supporting owing to the inherent mechanical strength of the polymer when solidified. The layer of resinous material may be clear, i.e., transparent, translucent, opaque or it may be colored by addition of coloring materials. As a coloring agent or material to be included with the resinous composition, there may be used a pigment or a dye; a pigment, however, tends to absorb infrared radiation with resultant heating and, therefore, reduces contrast and, therefore, dyes are generally preferred since they tend to transmit infrared rays rather than absorbing and converting such rays into sensible heat. Any suitable dye may be utilized. Typical examples may be a green color of a mixture of 10 percent Iosol Yellow, plus 90 percent of Victoria Blue BOC or Victoria Blue Base; Crystal Violet or Methyl Violet. To provide a dark red color there may be suitably used Rhodamine B-base.

After complete preparation of the substrate, an image is formed on the surface thereof by exposing the substrate in an imagewise fasion to an intense energy radiation source for example, a hot lamp. In the areas where light strikes softening occurs enhancing phase separation. The phase separation enhancement proceeds by growth of domain sizes and may be accompanied or aided by degradation of the species which ultimately form the domains. The results of phase segregation is to produce a light scattering phase. Since the melt phase scatters light differently from the unexposed areas of the substrate, the result is that a visible image is formed. The image making capabilities of a block copolymer system is thus based on contrast development through light scattering from coalesced domains. This system surprisingly reperesents a novel class of heterophase polymers capable of imagewise development.

Alternatively, the blocks in the copolymer may be of such sizes that an opaque coated substrate is formed. In general this means that the domain sizes of the blocks are of the magnitude of the wavelength of light (typically 1,000–10,000A). These domain sizes are obtained by increasing the length of the blocks. As previously explained, the scattering of light will strongly depend on the differences in the refractive index between the copolymer components. Therefore, the resulting copolymer prepared following this principle will produce essentially an opaque coating. Utilizing the method of imaging supra, the exposure will cause the domains to coalesce but the image produced at this time will be transparent in the areas where light strikes. The image is transparent because the coalesced blocks are now too large to scatter light in the visible region.

Further advantages can be taken of the repetitive use or cycling properties of the present invention. For example, the exposed recording material can be reused after several exposures. As previously pointed out, the copolymers of this invention are readily dissolved in solvents or they may be prepared by melt forming. Utilizing these properties, an exposed film forming copolymer may be contacted with sufficient solvent, i.e., spraying or any suitable method causing the copolymer to be redissolved. After complete evaporation of the solvent a solidified uniform film of the copolymer is again formed and the same is ready for reuse.

To produce the desired image any suitable substrate may be employed. Typical examples may include cellulose acetate, cellophane, Mylar, cellulose acetate butyrate, or sheets of thermo-setting resin reinforced with glass fibers as set forth in U.S. Pat. No. 2,718,476 and sheets of metals, such as steel, aluminum and other metals.

As a source of energy radiation, any suitable source may be employed. Typical examples are a hot soldering iron stylus, laser beams, infrared lamps and ultrasonic probes.

Any suitable block copolymer of the type AB or ABA in which the domain forming component has a suitable number average molecular weight of greater than 50,000 and preferably greater than 100,000 may be useful for the purpose of this invention where a transparent film is desired. On the other hand, if the film forming polymer forms an opaque coating, the average molecular weight must be approximately 2 million or greater. However, in the case where a dispersed homopolymer is mixed with the block copolymer, the molecular weight restrictions need not apply. Suitable block copolymers may not have the same refractive index for both components, and each component must have a transition or softening point so that phase separation takes place without substantial material degradation. Typical block copolymers may include copolymers, for example, from styrene and ethylene oxide; styrene and isoprene; styrene and butadiene; styrene and alkyl acrylates or alkyl methacrylates; alkyl acryaltes and alkyl methacrylates; styrene derivatives such as p-bromostyrene and ethylene oxide; styrene or its derivatives and siloxanes, such as dimethylsiloxane; styrene and esters or lactones, such as hexamethylene sebacate or $\epsilon$-caprolactone; block copolymers comprising poly (carbonates) and poly (siloxanes); and the like, and mixtures thereof.

As to the homopolymers usable in the application of this invention, any suitable component of one of the block copolymers shown supra may be employed.

DESCRIPTION OF THE PREFERRED EMBODIMENTS

The following preferred examples further define, describe and compare preferred materials, methods and techniques of the present invention.

EXAMPLE I

A thin film is cast from a solution comprising a block copolymer of polyethylene oxide-polystyrene (composition 80 percent by weight of PEO; number average molecular weight of the polymer is 500,000) and chloroform solution onto Mylar-polyester film. The film is allowed to air dry until dry to the touch and it is then dried under vacuum at 40° C. for 3 hours. The film obtained is translucent in appearance due to the crystallinity of the polyethylene-oxide component. An image is formed on the film by drawing a hot stylus (e.g., a fine tipped soldering gun) in close proximity but not touching the film. The film becomes very opaque having a whitish appearance in those areas exposed to the heat of the soldering gun tip. The letters drawn are clearly visible as white opaque characters on a translucent background.

EXAMPLE II

The polymer of Example I is melt cast as a thin film between aluminum sheets in a Pasadena Hydraulic Press at a temperature of 120° C. for 2 minutes. An image is formed by drawing with a hot stylus as in Example I.

EXAMPLE III

The polymer and film are formed according to Example I. An image is formed by thermal radiation from a heat gun exposed through a mask which comprises a metallized insulator, e.g., an aluminized polycarbonate. In the open, exposed areas to the heat from the gun causes opaqueness of the film, while in areas where the heat of the gun is reflected, no such opacity is observed to be formed.

EXAMPLE IV

PEO/PS/PEO block copolymer (composition 50 percent by weight of PEO, number average MW of the copolymer 600,000) is combined with commercially available Carbowax, poly(ethylene oxide) (Union Carbide Co.) in the proportion two parts of block copolymer to one part of polyethylene oxide. The system was cast from chloroform on a Mylar substrate and allowed to dry and the image was formed by the action of a hot stylus all according to the procedure of Example I.

EXAMPLE V

A thin film is cast from a solution comprising a block copolymer of polyethylene oxide-polystyrene (composition 80 percent by weight of PEO; number average molecular weight of the polymer is approximately 2 million) and chloroform solution onto Mylar-polyester film. The film is allowed to air dry until dry to the touch and it is then dried under vacuum at 40° C. for 3 hours. The film obtained is opaque in appearance. An image is formed on the film by drawing a hot stylus (e.g. a fine tipped soldering gun) in close proximity but not touching the film. The image becomes very clear in those areas exposed to the heat of the soldering gun tip. Letters drawn by hand are clearly visible as transparent on an opaque background.

Although the present examples are specific in terms of conditions and materials used, any of the above listed typical materials may be substituted when suitable in the above examples with similar results. In addition to the materials used to prepare the polymer composition of the present invention, other additives, methods of imaging, modified polymers and copolymers may be used if desirable. For example, binders, hardening and sensitizing agents may be added to the polymer composition for special effect.

Anyone skilled in the art will have other modifications occur to him based on the teachings of the present invention. These modifications are intended to be encompassed within the scope of the invention.

What is claimed is:

1. A heat-sensitive, dry, non-tacky recording material comprised of a substrate having a uniform coating, said coating comprising a film forming block copolymer which upon imagewise exposure to intense energy radiation undergoes phase separation in the exposed areas giving rise to submicron spherical domain structures, thereby to provide a visible contrast with the surrounding unexposed areas.

2. The recording material according to claim 1 wherein said film forming copolymer forms a transparent or translucent coating.

3. The recording material according to claim 1 wherein said film forming copolymer forms an opaque coating.

4. A recording material according to claim 1 wherein said block copolymer is selected from the group consisting of polyethylene oxide-polystyrene, polystyrene-polybutadiene-polystyrene and mixtures thereof.

5. A recording material according to claim 1 wherein said coating comprises a mixture of a block copolymer and a homopolymer.

6. A recording material according to claim 1 wherein the said recording material is reusable.

7. A recording material according to claim 1 wherein said film forming block copolymer is self-supporting.

8. A method of forming a recording which comprises exposing in an imagewise manner a recording member comprising a substrate having a uniform coating on its surface of a film forming block copolymer which upon exposure to intense energy radiation undergoes phase separation in response to such intense energy radiation to thereby provide a visible contrast with the surrounding unexposed areas.

* * * * *